3,711,440
POLYURETHANES PREPARED FROM POLYESTER ORGANIC DIISOCYANATES AND BIS-(β - HYDROXYETHOXY-PHENYL) METHANE

David H. Chadwick, New Martinsville, W. Va., assignor to Mobay Chemical Company, Pittsburgh, Pa.
No Drawing. Filed Feb. 24, 1971, Ser. No. 118,504
Int. Cl. C08g 22/10
U.S. Cl. 260—47 CB          5 Claims

ABSTRACT OF THE DISCLOSURE

Elastomeric polyurethane polymers are prepared by reacting a polyisocyanate with an organic compound having active hydrogen atoms which are reactive with —NCO groups and bis-(β-hydroxyethoxyphenyl)methane as a chain-extender. The elastomers have good physical properties and improved resistance to hydrolysis.

FIELD OF INVENTION

This invention relates to polyurethane polymers and to a method of preparing the same. More particularly, the invention relates to elastomeric polyurethane polymers of improved physical and mechanical properties and having improved resistance to hydrolysis and to a method of preparing the same.

DISCUSSION OF PRIOR ART

The production of cross-linked synthetic resins based on polyhydroxyl compounds, polyisocyanates and chain lengthening agents or cross-linking agents having reactive hydrogen atoms such as glycols, diamines, aminoalcohols and the like has been heretofore known. The proportions may be so chosen that free —NCO groups remain and the molten reaction mixture may be poured into molds, cross-linkages being formed by way of allophanate groups, biuret groups, by polymerization or the like after it has been poured. Elastomeric shaped articles are obtained. Alternatively, the —NCO groups which remain may be stabilized or the process may be carried out with equivalent quantities or with an excess of reactive hydrogen atoms. By this method there are obtained polyurethane compositions which can be stored and which can be cross-linked with cross-linking agents in a manner similar to crude rubber by the usual methods of the rubber industry, for example, on rollers. However, the elastomers obtained in many cases have only relatively low tensile strengths at elongations of from about 300% to about 500%. Fillers have heretofore been used to increase the modulus somewhat, but do not improve the ultimate tensile strength. Moreover, in many cases the elastomers do not retain an acceptable portion of their tensile strength when subjected to conditions of hydrolysis aging.

OBJECTS

It is, therefore, an object of this invention to provide polyurethane polymers and a method of preparing the same which are devoid of the aforesaid problems and disadvantages. Another object of this invention is to provide improved polyurethane polymers. An additional object of this invention is to provide a method of preparing improved polyurethane polymers. A further object of this invention is to provide polyurethane polymers having a desirable combination of properties and to a process of preparing the same. A still further object of this invention is to provide a method for the preparation of polyurethane polymers having a wide range of desirable mechanical and physical properties. Yet another object of this invention is to provide elastomeric, nonporous polyurethane polymers having improved retention of tensile strength upon being subject to conditions of hydrolysis aging.

SUMMARY OF THE INVENTION

The foregoing objects and other which will become apparent from the following description are accomplished in accordance with this invention, generally speaking, by providing polyurethane polymers prepared by reacting a substantially linear compound having active hydrogen atoms as determined by the Zerewitinoff test, which active hydrogens are reactive with isocyanato groups, and an excess of an organic polyisocyanate with a chain extending agent comprising bis(β-hydroxyethoxyphenyl)methane in an amount at least sufficient to react with all the —NCO groups of the reaction product obtained from the organic compound having active hydrogen atoms and the organic isocyanate. Thus, the invention contemplates the preparation of elastomeric polyurethane polymers wherein the chain extender set forth above is used in place of the customarily used chain extending agents.

DETAILED DISCLOSURE OF THE INVENTION

This invention is applicable to the production of any suitable polyurethane polymer from any suitable substantially linear organic compound containing active hydrogen atoms, such as, for example, dihydroxyl polyesters, polyalkylene ether glycols, polythioethers, dihydric polyacetals, polyester amides and the like but it is preferred to use a polyhydric polyalkylene ether, a polyhydric polythioether and most preferably a hydroxyl polyester obtained by a process which comprises condensing a polycarboxylic acid and a polyhydric alcohol.

Any suitable hydroxyl polyester may be used in the process of this invention such as, for example, the condensation product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, malonic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid, and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-(hydroxy ethyl ether), 2,2'-diphenyl propane, 4,4'-bis-(hydroxy ethyl ether) and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol, arabitol, sorbitol, maltose, sucrose, ammonia, diethenolamine, triethenolamine, 2,4-tolylene diamine and the like. Any suitable alkylene oxide condensate may also be used such as, for example, the condensates of ethylene oxide, propylene oxide, butylene oxide, amylene oxide, styrene oxide and the like and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Pat. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxypropyl sulfide, 4,4'-dihydroxybutyl sulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Mixtures of any of the compounds of the classes set forth hereinabove may be used also.

The organic compound containing active hydrogen atoms should preferably be substantially linear or only slightly branched and have a molecular weight of at least about 600 and for best results, a molecular weight of from about 1000 to about 3000, a hydroxyl number of from about 75 to about 35 and an acid number less than about 2.

Any suitable organic diisocyaante may be used in reaction with the organic compound containing active hydrogen atoms to produce polyurethane polymers such as, for example, aliphatic, cycloaliphatic, aromatic and heterocyclic isocyanates, such as alkylene, cycloalkylene and arylene diisocyanates which may be substituted with substituents unreactive with active hydrogen and isocyanato groups such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate and their isomeric mixtures, dimeric tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene- 2,4-diisocyanate and the like. Other suitable polyisocyanates are among those mentioned, for example, in U.S. Pat. No. 3,382,215. It is preferred that aromatic diisocyanates be used and for best results, 4,4'-diphenylmethane diisocyanate or isomeric mixtures of tolylene diisocyanates have proven to be especially suitable.

As set forth hereinabove the chain extender of this invention is bis-(β-hydroxyethoxyphenyl)methane, preferably, the para, para'-isomer. The chain extender of this invention is a known compound and may be prepared for example, by reacting phenol with ethylene oxide to form phenoxyethanol and reacting phenoxyethanol with formaldehyde in the presence of hydrochloric acid to form the desired bis-(β-hydroxyethoxyphenyl)methane according to the following equations:

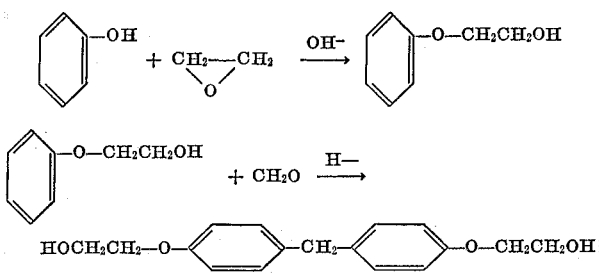

As an example, the chain extender of this invention may be prepared in the following manner. About four mols phenoxyethanol, prepared by reacting phenol and ethylene oxide in a known manner, about 1 mol of a 37% solution of formaldehyde and about 100 ml. of concentrated hydrochloric acid are mixed and stirred at about 25° C. to 30° C. for about 12 hours and subsequently heated at reflux for about 6 hours. The mixture is then cooled to about room temperature and neutralized with a 30% NaOH solution. Excess phenoxyethanol is stripped off at about 135° C.–140° C./15 mm. The main fraction is obtained by distillation at about 230° C.–250° C./0.5 mm. and the product is recrystallized from benzene. About a 65% to 70% yield of bis-(β-hydroxyethoxyphenyl) methane having a melting point of about 104.5° C. is obtained.

In some cases it may be necessary to increase the rate of reaction of the active hydrogen containing organic compounds and the organic polyisocyanate and if this is desired, one may use any suitable catalyst for the isocyanate-active hydrogen reaction, such as, for example, tertiary amines, such as N-ethylmorpholine, dimethyl benzyl amine, dimethyl stearyl amine, N,N'-endoethylene piperazine, triethylene diamine and the like as well as metal catalysts such as dibutyl tin dilaurate, dibutyl tin-di-2-ethyl hexoate, stannous octoate, stannous oleate, lead naphthanate and the like and mixtures thereof.

The purpose of this invention is applicable to the preparation of elastomeric products by the various methods known to those skilled in the art. Thus, the organic compound containing active hydrogen atoms, the polyisocyanate and the chain-extending composition can be mixed together in the proper proportions and cast in the usual casting technique into a mold having the desired configuration. Also, this same result can be accomplished by first reacting the polyisocyanate and the organic compound containing active hydrogen atoms to obtain an —NCO terminated prepolymer and then mixing this prepolymer with the chain-extending composition in the casting technique.

In any case the reaction mixture is cast into a mold and it is cured at any suitable temperature and preferably at a temperature within the range of about 100° C. to about 150° C., the curing time being somewhat dependent on the temperature at which curing is effected. Most preferably, the final mixture of reaction components is cast into a mold and cured at a temperature of about 110° C. for about 24 hours.

The process is also useful in the millable gum technique wherein the organic compound containing active hydrogen atoms, the chain-extending composition and a deficiency of the polyisocyanate are first reacted to form a millable gum and then this millable gum is further mixed with an additional quantity of an organic polyisocyanate such as dimeric tolylene diisocyanate on a roll mill such as that used in the rubber industry, and the final product formed by a compression molding technique or the like. In this millable gum technique, a suitable peroxide such as, for example, dicumyl peroxide may be incorporated into the millable gum to bring about the cross-linking.

In addition, the process of this invention is useful in what has been termed the thermoplastic technique wherein the reaction compounds are mixed and caused to partially react. The reaction is then interrupted while the material can still be worked by thermoplastic techniques. At this point the material is generally in the solid state. This solid partially reacted material can be fabricated into the desired final form by molding techniques such as, for example, compression molding, injection molding, extrusion, and the like. In this technique, as well as in the casting and millable gum procedures, a one-shot mixing system or a prepolymer procedure can be followed.

The individual reaction components and the proportion in which they are added can be chosen according to the basic properties desired of the end product. However, it is preferred that the isocyanate be present in an amount sufficient to react with all of the active hydrogen atoms present and particularly in an amount such that a slight excess is present based on the active hydrogen atoms present in the other reaction components. For best results, it is preferred that the isocyanate be present in an amount such that the NCO to active hydrogen ratio is from about 1.0 to about 1.1.

UTILITY

The polyurethane plastics obtained by the process of the present invention are useful in a variety of applications, such as, for example, the preparation of molded articles, tires, toys, shoe heels, bearings, gear wheels, valve seals, as insulated cable covering for electrical wire and the like.

EXAMPLES

The invention is further illustrated but is not intended to be limited by the following examples in which all parts and percentages are by weight unless otherwise specified.

EXAMPLES 1-4

Elastomers were prepared by mixing polyester chain-extender and isocyanate in a molar ratio of about 1:2:3.15 or 1:3.38:4.6 respectively. The molar portion of a polyester having a molecular weight of about 2,000 and an OH number of about 58 prepared by condensing about 1 mol of adipic acid with about 1.09 mols of glycol is dehydrated by heating to a temperature of about 125° C. and reacted with the molar portion of 4,4'-diphenylmethane diisocyanate and the molar portion of the chain extender. The reaction mixture is pressed into a hot mold, removed and cured by heating to a temperature of about 110° C. for about 24 hours. The resulting substantially homogeneous polyurethtne plastics obtained exhibit the following physical characteristics as set forth in the table below.

| Ex. no. | Molar ratio polyester chain extender isocyanate | Elongation, percent | Set, percent | Tensile, p.s.i. | 300% modulus, p.s.i. | Shore hardness A | Shore hardness D |
|---|---|---|---|---|---|---|---|
| 1 | 1:2:3.15 | 500 | 60 | 6,275 | 2,000 | 85 | 38 |
| 2 | 1:3.38:4.6 | 400 | 75 | 4,150 | 3,000 | 91 | 49 |
| 3 | 1.0:1.9:3.2 | 450 | 4 | 6,600 | 2,200 | 81 | 30 |
| 4 | 1.0:3.5:4.9 | 200 | 94 | 5,600 | 5,600 | ---- | 71 |

COMPARISON EXAMPLE

For comparison purposes an elastomer is prepared in a manner similar to Example 4 except that p-phenylene-di(β-hydroxyethylether),

is employed as the chain extender instead of bis(β-hydroxyethoxyphenyl)methane. When this elastomer is hydrolyzed at 100° C. and 100% relative humidity the elastomer retains only 34% of its original tensile strength after 4 days hydrolysis aging and completely falls apart after 7 days exposure whereas the elastomer of Example 4 retains 95% of its original tensile strength after 4 days exposure and 70% after 7 days hydrolysis aging at 100% relative humidity and 100° C.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. An elastomeric non-porous polyurethane polymer prepared by a process comprising reacting a polyester containing hydroxyl groups reactive with —NCO groups, said polyester having a molecular weight of from about 600 to about 3000 and a hydroxyl number from about 75 to about 35, and an excess of an organic diisocyanate with a chain extender wherein said chain extender is bis(β-hydroxyethoxyphenyl) methane in an amount such that the NCO to active hydrogen ratio is from about 1.0 to about 1.1.

2. The polymer of claim 1 wherein the organic diisocyanate is an aromatic diisocyanate.

3. The polymer of claim 2 wherein the aromatic diisocyanate is 4,4'-diphenylmethane diisocyanate.

4. The polymer of claim 1 wherein the organic diisocyanate is reacted with the polyester containing active hydrogen atoms reactive with —NCO groups in a first step to prepare an NCO terminated prepolymer and reacting said NCO terminated prepolymer with bis-(β-hydroxyethoxyphenyl) methane.

5. The polymer of claim 1 wherein the chain extender is 4,4'-bis-(β-hydroxyethoxyphenyl)methane.

References Cited

UNITED STATES PATENTS

| | | | |
|---|---|---|---|
| 3,577,385 | 5/1971 | Feltzin et al. | 260—47 |
| 3,012,992 | 12/1961 | Pigott et al. | 260—75 |
| 3,164,565 | 1/1965 | Calamari | 260—47 |
| 3,357,954 | 12/1967 | Kirkaldy | 260—75 |
| 3,436,361 | 4/1969 | Wooster | 260—18 |

WILLIAM H. SHORT, Primary Examiner

L. L. LEE, Assistant Examiner

U.S. Cl. X.R.

260—75 NP, 77.5 AM, 77.5 SP